Jan. 8, 1957 E. SCHUMACHER 2,776,595
LINE-VARIATOR
Filed March 2, 1953
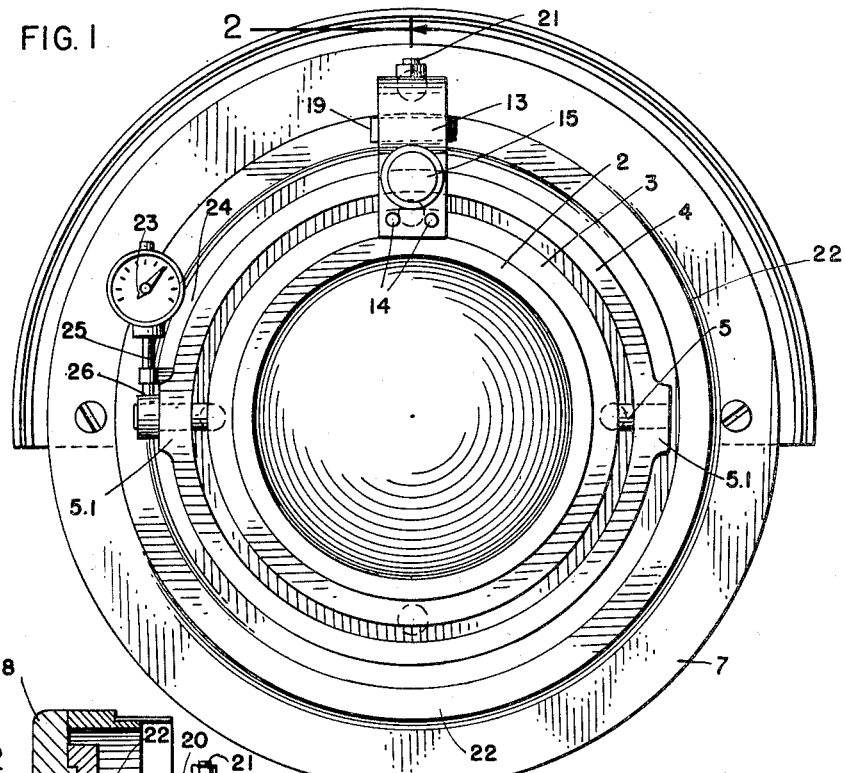
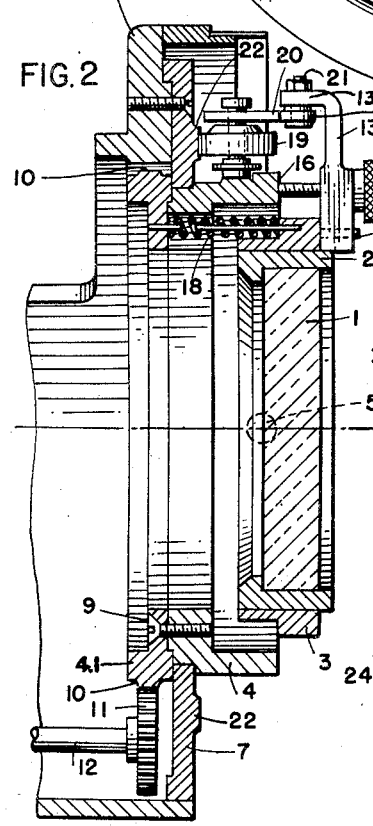
INVENTOR:
ERNST SCHUMACHER
BY
ATT'YS ited States Patent Office 2,776,595
Patented Jan. 8, 1957

2,776,595

LINE-VARIATOR

Ernst Schumacher, Frankfurt am Main, Germany

Application March 2, 1953, Serial No. 339,666

Claims priority, application Germany March 3, 1952

2 Claims. (Cl. 88—24)

This invention relates to photographic apparatus for producing half-tone films or plates and particularly to improvements in process and means for descreening, line variation, and controlling the size, shape and density of the half-tone dots formed by the transmission of the image through a screen disposed in front of the light sensitive surface.

The main objects of this invention are to provide an improved process for photographically altering the usual half-tone dot formation to avoid loss of fine lines and details and to minimize the grain in the half-tone reproductions; to provide an improved process for producing half-tone negatives and positives having an increased range of color or shade variations; to provide such a process wherein portions of the picture image may be amplified or strengthened without the use of masking procedures; and to provide such a process whereby any desired effect may be had either line amplification or descreening operations.

Further objects of this invention are to provide an improved apparatus for photographically altering the half-tone dot formation on half-tone negatives and positives without adjustment of the half-tone screen; to provide such an apparatus capable of providing substantially any desired size, shape or density in the individual half-tone dots; to provide such a means whereby lines in one direction may be amplified or diminished without change of lines running in another direction; to provide such an apparatus that can be readily adjusted to change the pattern or effect of its operation; and to provide such a device or apparatus of simple construction and yet precisely adjustable and easily operable.

In particular, this invention is concerned with a process and a mechanism for photographic image variation for the production of half-tone printing plates, and in particular the changing or varying of line thickness and descreening, and the varying of the size, shape and density of the half-tone dots, by means of a tiltable, preferably planoparallel, optical body which is inserted in the light path a short distance in front of or in back of the camera lens in such a manner that the tilt axis of the optical body is normal to and arranged to rotate around the optical axis of the camera lens, or around an axis following a predetermined course parallel to the lens axis.

The procedure for the utilization of the effect of light rays diverted by a planoparallel plate and used for universal amplification of lines, especially in cartography, is already known. However, this procedure has been adapted thus far, only for the purpose of line amplification in cartography; that is, even in that field its practical use has been very limited. By means of my improved process herein disclosed, and an improved mechanism for performing the process, a broad field of application is opened to the known principle mentioned above. The principle of the optical element or body in the form of a tiltable planoparallel plate, may be used not only for the strengthening or amplification of lines, but also for the partial extinguishing or diminishing of lines, for improving the range of color density and shade variation by greater control of half-tone dot formations produced by means of the half-tone screen; for removing the clouded or moiré effect often produced by the half-tone screens; for the damping or reduction of granularness in copies to be reproduced; and for selectively weakening or intensifying various picture areas.

According to the present invention this extensive problem is solved by the coupling of the tilt movement of the deflecting disc or light diverting optical body with the mechanical rotation of the tilt axis, and at the same time varying the tilt angle of the optical body during rotation in accordance wih the desired results to be obtained. Also, variable speed ratios of rotation and tilt movement of the optical body may be provided for.

The essential feature of the process and apparatus herein disclosed is, however, that the solution of the complex requirements in any particular problem may be accomplished as desired by merely changing the ratio or timing of the tilting and rotating movements of the optical body, which also makes possible a new result in either straight transmissions or in the form of variation in the size, shape, and density, characteristics of an amplified image point. For example, the new process and apparatus permits the descreening of uniformly screened copies by adapting the image displacement to the screen scheme of the copy.

The present invention further provides an accurate control and adjustability for the amplitude of tilt movement of the optical body during its rotation, and an adaptability of the process, until now not possible, to substantially every kind of reproduction problem through adjustability of the actual point of occurrence of tilt movement, or tilt angle variation, in accordance with any desired angular position of the tilt axis during its rotation.

In this connection, by means of a variable ratio of the individual kinds of movements that may be imparted to the optical body, a pointed image or fine dot can be, for example, widened to a four cornered shape. It is this possibility which opens to the printing technique or graphic arts, a greatly increased field of operation particularly in the performance of unobjectionable descreenings.

Furthermore, the principle of variation of line thickness may also be used for diminishing, and even for complete extinguishing of lines, which may be desirable in cases where a positive picture is made directly from a positive. When these lines are diminished the points of crossing result in a so-called knotty effect, which has its origin in the rotational movement of the optical body. This knotty effect, however, with the help of the present process, can be eliminated since the movement of the optical body, as already mentioned, can be controlled by optional change of the speed for the movable parts, so that through variation of the tilt angle of the optical body according to an even pattern squarely limited reduced planes, that is light planes, can be formed. On the other hand the rounding off of the corners resulting from line amplification can be eliminated by means of the present process.

In addition this solution of the problem of moving the optical body in various ways offers many other possibilities; for example, in those cases where it is necessary that no rotation or circulation of the tilt axis occur, but rather that the optical body be merely pivoted around a tilt axis oriented at an exact angular position, or if necessary at two successive positions lying at a predetermined angle to each other. For instance, one can intensify or amplify the perpendicular lines of a map while holding the original intensity of the horizontal lines. This specific amplification in one direction, while retaining the original strengths in the direction perpendicular to it, is among other things essential when plans have to be made in extraordinary strong distortion. Such is the case, for example, in railroad station plans which, in addition to copies having true scale measurements, should again be reproduced in another edition with extremely distorted measurements. Here the specific intensification of the lines which are affected the most by the distortion is necessary and useful.

When preparing a copy in the normal way from a negative subsequently by contact printing a transparency, both of them, when put together face to face, can be placed in register so that practically both negative and transparency will fully match each other, i. e. so that no translucent light may be observed. However, when preparing from the same copy a normal negative and a reduced negative and from the latter a transparency, to be brought in register with the normal negative, naturally a fine rim or contour lines between these two plates will appear. This preparation of contours can be of great importance and is only mentioned as example. An even more abbreviated procedure can be attained if the normal negative, that is the first negative which is obtained without the line variator, is exposed in the mask-holder of the camera in order to be reinserted in the mask-holder after development and then another exposure through this normal mask negative onto a sensitive plate behind it is to be made, by simultaneous interposition of the line variator, the result will be that, immediately, a positive contour is obtained. It is self-evident that additionally a screen or hatching lines or—to speak in terms of the textile printer—a hachure can be printed down or insolated into this positive.

Further, this new procedure can be combined with filtering methods in order to facilitate thereby proper registering in multicolor printing, especially with a view to limiting the black contour while processing the color plates. For instance in multicolor printing where two colored areas join one another, for printing reasons it is necessary to have somewhat enlarged printing areas so that they are actually overlapping each other. As a matter of fact, small differences in register are unavoidable during the printing process and unless proper overlapping is accounted for, white rims would appear at these places, that is, as an embarrassing effect, the surface of the paper would be visible. Therefore, these areas are prepared with somewhat widened dimensions so that they will overlap each other so that, despite minor displacements during the printing process, the surface of the paper does not show at the contacting borders. This task can also be accomplished in an excellent manner by the present invention. The same may be said of the contact of black contours with colored areas, at which a sufficient overlapping must also be insured.

Whenever application of the improved device in combination with the individual printing plates for multicolor printing is intended, it stands to reason that the optical body has also to be present in the path of the light rays for those partial plates for the making of which the line variator is not in operation. In this use, at least the planoparallel plate has to be interposed because otherwise differences in register would occur between those color selections made with the planoparallel plate and those made without it, regardless whether the plate is in motion or not. For this reason, and others, a precise zero position of the optical body is highly important. As already suggested, according to the invention, a possibility for precise calibration and precise adjustment respectively of the optical body into the vertical, or any angular position is provided for by means of an indicating instrument whereby both zero position and any angle position of tilt can be precisely adjusted.

For proper performance of the procedure as specific design, pursuant to the invention, a contrivance is proposed, in which a tiltable tubular holder for the optical body is arranged in a rotating frame which is coupled with a drive; and a coupling between the holder and a stationary part of the apparatus, according to the invention, is effected by a rolling element which is co-operating with a special stationary plane, adjusted vertically to the optical axis. The rolling element can be switched off at will and it is exchangeable. Owing to this contrivance, it is not only possible to perform easily for the first time the above-mentioned new procedure of the separation of the individual motions and the adjustment of an optional transmission ratio, but it also represents both in manufacture and in practice a considerable simplification, compared with the devices known up to now.

A specific embodiment of this invention is shown in the accompanying drawings in which:

Figure 1 is a front elevational view of the improved device adapted for mounting in front of a camera lens.

Fig. 2 is a sectional view of the same as taken on line 2—2 of Fig. 1.

Fig. 3 is a fragmentary detail view showing a means for operating a lens tilt-angle gage for the device.

Fig. 4 is a fragmentary view showing a modified arrangement for control of the lens tilt-angle during operation of the device, and Fig. 5 is a sectional view as taken on line 5—5 of Fig. 4 illustrating one form of a variable tilt-angle cam.

In the form shown in the drawings, the improved device comprises a transparent optical body 1 made of optical glass, and in the form of a planoparallel plate, or plate having plane parallel face surfaces, which is rigidly mounted in a peripheral shell or casing 2, which in turn is firmly mounted in a frame or holder 3.

The holder 3 is mounted swingably in an annular carrier 4 on a pair of diametrically opposed trunnions 5, which are fast to and project laterally from the frame 3 into suitable bearings formed in bosses 5.1 on opposite sides of the carrier 4. The trunnions 5 are precisely aligned on a common axis and the common axis of the bearings in the carrier 4 is located to intersect and be exactly at right angles to the central axis 6 of the carrier. The carrier 4 is mounted, for rotation about its axis 6, in a rigid mounting ring 7 which in turn is fixedly secured to a housing 8, and the mounting ring 7 is disposed so that its forward face surface lies in a plane precisely perpendicular to the rotation axis 6 of the carrier.

A drive ring 4.1 is rigidly attached to the inner end of the carrier 4, as by a plurality of screws 9, and, as shown in Fig. 2, the drive ring is provided with a toothed periphery 10 for engagement with a pinion 11, having a drive shaft 12, which in turn is operated by a suitable motor, not shown. Thus by means of the driving pinion 11 and the drive ring 4.1, the carrier 4 may be rotated on its mounting ring 7, and about the central axis 6 in a plane precisely perpendicular thereto.

As shown in Fig. 2, the retaining frame 3 is provided with a radial bracket member 13, rigidly attached to the frame 3, as by pins 14, and an adjusting screw 15 is mounted in a suitably threaded opening in the lower portion of the bracket 13 in a position to engage the front surface 16 of the carrier 4 and thereby provide a means for regulating the tilt position of the optical body 1 on the axis of its trunnions 5, and relative to the carrier axis 6. A lock nut 17 is provided on the screw 15 to hold it fast in any position of adjustment to which it might be set.

The frame 3 is also connected to the carrier 4, at a point circumferentially midway between the trunnions 5, by means of a tension spring 18 which normally urges the connected portion of the frame 3 inwardly of the carrier so as to hold the inner end of the adjusting screw 15 in engagement with the end face 16 of the carrier. Thus, by means of the spring connection 18, the optical body 1 may be tilted on the trunnions 5, in the forwardly or outwardly direction, but will always be urged to return to its initial position as determined by the adjusting screw 15.

An automatic varying-tilt or wobble movement may be imparted to the optical body 1, by means of a roller 19 mounted on the carrier 4 and arranged to drive a cam disk 20, which in turn engages a small roller 20.1 attached to an inwardly extending arm 13.1 of the bracket 13 by means of a bolt 21. The roller 19 is rotatably mounted on an axle which is radial with respect to and fixedly mounted on the carrier 4 and is positioned to engage the front face surface of the mounting ring 7, on which suitable track 22 is formed. The cam disk 20 may be formed as desired to provide any predetermined wobble or varying tilt movement to the optical body 1, during rotation of the carrier 4 under the influence of the driving pinion 11, and it will be understood that the cammed disk 20 is removable and interchangeable to permit changing of the wobble pattern.

A gage 23 for measuring the degree of tilt of the optical body 1, with respect to its normal position exactly perpendicular to the rotation axis 6, is mounted on the outer surface of the carrier 4, by means of a suitable bracket 24, and as shown, the gage 23 is provided with a stem 25 which engages a lever arm 26 rigidly attached to and projecting radially from one of the trunnions 5. Thus any tilting of the optical body 1 and its frame 3, on the trunnions 5 and relative to a position perpendicular to the rotation axis 6, will by means of the lever 26 be transmitted to the gage 23, and thereby indicated.

In the modified form of the tilt operating and control means shown in Figs. 4 and 5 the front face of the mounting ring 7, which is perpendicular to the rotation axis 6, is provided with an annular rack 27 having teeth adapted to mesh with the teeth of a pinion 28 rotatably mounted on the carrier 4 on an axis radial therewith. The pinion 28, in turn, is drivingly connected with a cone-like cam body 29, transverse sections of which are eccentric to the pinion axis or shaped as desired to produce the desired cam action.

The roller 19, in this modified arrangement of the device, is rotatably mounted on the arm 30 of an adjustable angle bracket 31, which in turn is mounted on a radial member 32, secured to and projecting from the rim of the frame 3, by means of a lock screw 33. The axis of the roller 19 is parallel with the rotation axis of the cone-cam 29 and the members 32 and 31 are suitably slotted for passage of the lock screw 33 and adjustment of the parts in the direction of the roller axis.

It will be understood that the cone-cam 29 is removable and interchangeable and may be either a right circular cone turning on a concentric axis or on an eccentric axis depending upon whether a uniform tilt position of the optical body 1 is desired or whether a wobble action is wanted, or the cam may be of irregular cone-shape so that any section, transverse the axis, will have a shape providing a definite lobe as at 34 in Fig. 5. The adjustability of the bracket members 31—32 permits variation of the extent of the tilt action in the wobble pattern.

In the operation of the improved device shown the housing 8, which contains the device, is mounted on the front side of a camera lens holder and over the camera lens so that the rotation axis 6 is precisely aligned with the optical axis of the camera lens. When the optical body 1 is exactly perpendicular to the lens axis its effect on the normal operation of the lens will be constant. However, any tilt of the optical body 1, on the trunnions 5 and relative to the camera lens axis, will cause a corresponding displacement of the light beams passing into the lens and, in the making of half-tone plates or films, have an effect similar to that produced by a lateral shifting of the half-tone screen. Thus, when the tilt angle is constant and the optical body is driven rotatively, by means of the driving pinion 11, the light beams passing into the camera lens will follow a circular path.

The optical body 1 and its carrier 4 are rotated at a constant speed by means of a suitable electric motor contained in the housing 8 and connected to the pinion drive shaft 12, and during such rotation the body 1 may be variably tilted on its tilt axis 6, by means of the cam and roller arrangement, so as to produce substantially any photographic effect.

It will be understood that the cams are interchangeable with others for producing various desired effects and it will also be understood that the roller 19 may be eccentric and run against a plane surface to provide any desired wobble or variable tilt action of the optical body 1. Also it will be understood that the mounting ring 7 may be calibrated to coact with an index mark on the carrier ring 4 for determination of the precise angular position of the optical body tilt axis at any time.

As used herein the term "optical body" is intended to mean a body of transparent substance capable of transmitting light rays. "Planoparallel" as used with reference to the optical body is intended to mean that the opposite face surfaces of the transparent body through which light is transmitted are plane and parallel with each other.

Although but one specific embodiment of this invention is herein shown and described it will be understood that details of the construction shown may be altered or omitted without departing from the spirit of this invention as defined by the following claims.

I claim:

1. A device of the character described comprising a frame, a carrier rotatively mounted in said frame for rotation about a fixed axis and in a plane normal to said axes, an optical body aligned with said fixed axis and pivotally mounted on said carrier on a transverse axis lying parallel with the plane of rotation of said carrier, means for variably adjusting the angular position of said optical body about said transverse axis and with respect to the plane of said carrier in response to rotation thereof, means for shifting the angular position of said carrier about said fixed axis, and an adjustable limit stop bearing between said optical body and said carrier for selectively setting the minimum angular displacement of said optical body relative to the plane of said carrier.

2. A device of the character described comprising a supporting frame, a carrier rotatively mounted in said frame for rotation about a fixed axis, an optical body aligned with said fixed axis and pivotally mounted on said carrier on a pivot axis intersecting and normal to the axis of rotation of said carrier, means for rotating said carrier about said fixed axis, an eccentric cone-cam on said carrier mounted for rotation on an axis radial thereto, drive means for said cone-cam engageable with an annular track fixed to said frame and surrounding said carrier, and a radially adjustable cam follower engageable with said cam and connected to said optical body for moving said optical body about its pivot axis in response to rotation of said cam.

References Cited in the file of this patent

UNITED STATES PATENTS

| 1,696,431 | Crockett | Dec. 25, 1928 |
| 2,233,441 | Whittaker | Mar. 4, 1941 |
| 2,619,873 | Ellett | Dec. 2, 1952 |

FOREIGN PATENTS

| 574,772 | Germany | Apr. 20, 1933 |